*(12)* United States Patent
Kaneko

(10) Patent No.: US 7,000,135 B2
(45) Date of Patent: Feb. 14, 2006

(54) CLOCK CONTROL METHOD AND INFORMATION PROCESSING DEVICE EMPLOYING THE CLOCK CONTROL METHOD

(75) Inventor: Keisuke Kaneko, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 627 days.

(21) Appl. No.: 10/093,543

(22) Filed: Mar. 8, 2002

(65) Prior Publication Data

US 2002/0129292 A1 Sep. 12, 2002

(30) Foreign Application Priority Data

Mar. 8, 2001 (JP) .............................. 2001-065403

(51) Int. Cl.
*G06F 1/12* (2006.01)
*G06F 9/30* (2006.01)
*G06F 15/00* (2006.01)
(52) U.S. Cl. .......................... 713/400; 712/200; 712/23
(58) Field of Classification Search ................ 713/400; 712/226, 200, 219
See application file for complete search history.

(56) References Cited

U.S. PATENT DOCUMENTS 5,148,528 A * 9/1992 Fite et al. .................... 712/210
5,560,028 A * 9/1996 Sachs et al. .................. 712/23
5,961,630 A * 10/1999 Zaidi et al. .................. 712/200
5,987,620 A 11/1999 Tran
6,247,134 B1 * 6/2001 Sproch et al. ............... 713/320
6,393,579 B1 * 5/2002 Piazza ........................ 713/600
6,609,193 B1 * 8/2003 Douglas et al. ............. 712/219
6,611,920 B1 * 8/2003 Fletcher et al. ............. 713/322

FOREIGN PATENT DOCUMENTS

JP 8-202549 8/1996

* cited by examiner

*Primary Examiner*—Lynne H. Browne
*Assistant Examiner*—Stefan Stoynov
(74) *Attorney, Agent, or Firm*—Hamre, Schumann, Mueller & Larson, P.C.

(57) ABSTRACT

In an information processing device including a processing circuit that performs processing in synchronization with a clock, and a clock supply control circuit that controls supply of the clock to the processing circuit, the number of cycles required from start of execution of processing in the processing circuit until output of a result of the processing is extracted, the extracted number of cycles is transferred to the clock supply control circuit, the supply of the clock is started when the processing is started in the processing circuit, and the supply of the clock to the processing circuit is stopped when the supply of the clock with the number of cycles is completed. Thus, a clock control method and an information processing device employing the clock control method are provided that allow power consumption to be reduced without impairing an execution efficiency of pipeline processing.

14 Claims, 15 Drawing Sheets

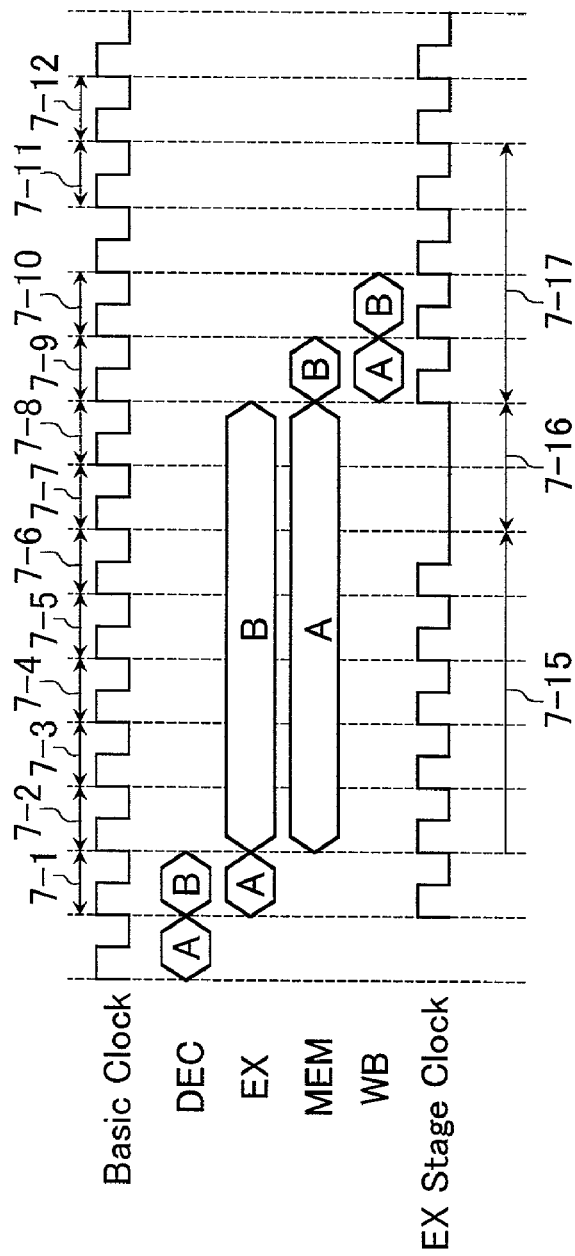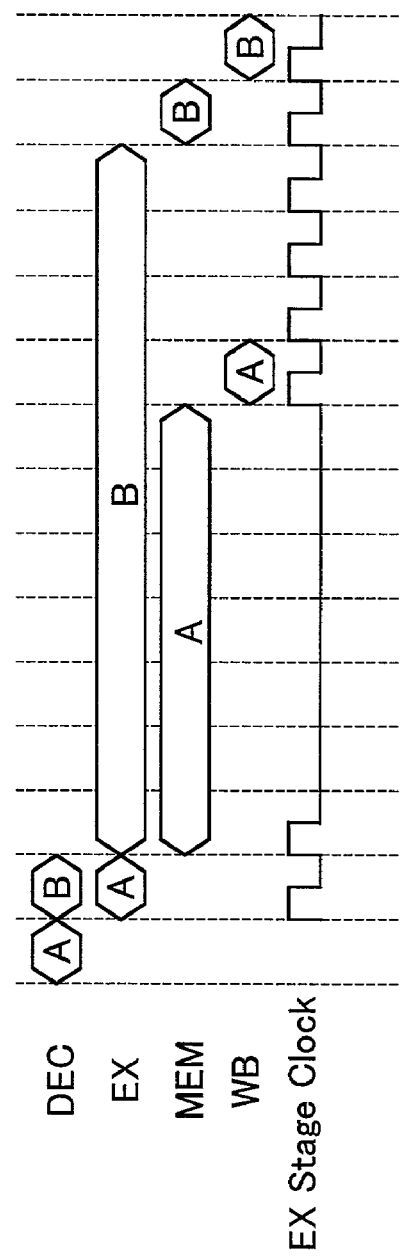
FIG.7A
FIG.7B PRIOR ART

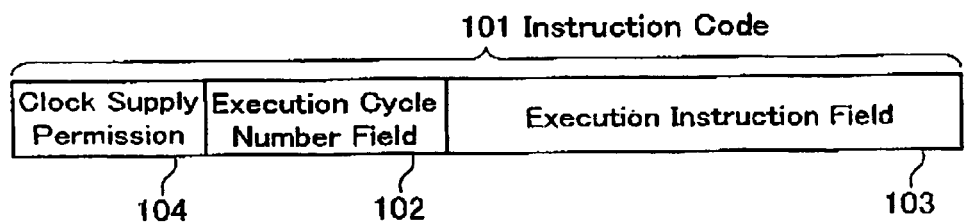
FIG.10
PROG-A
    mov   (a0), d0   ———Instruction 1
    add   0x01, d1   ———Instruction 2
PROG-B
    mov   (a0), d0   ———Instruction 3
    add   0x01, d0   ———Instruction 4
FIG.11
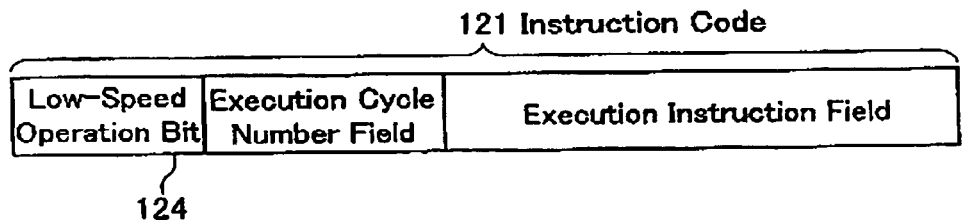
FIG.12

CLOCK CONTROL METHOD AND INFORMATION PROCESSING DEVICE EMPLOYING THE CLOCK CONTROL METHOD

BACKGROUND OF THE INVENTION

1. Field of the Invention

The present invention relates generally to an information processing device in which a processor is employed. It particularly relates to an information processing device having a characteristic in a clock supply control method.

2. Related Background Art

In information processing devices including processors that process instructions, usually pipeline processing is carried out so as to improve the throughput of execution of instructions. As a common pipeline structure, a five-stage structure is used often, which is composed of an IF stage (instruction fetching stage), a DEC stage (instruction decoding stage), an EX stage (instruction execution stage), a MEM stage (memory access stage), and a WB stage (memory write-back stage). Normally, processes at the stages are executed while clocks of the same frequency are supplied to each stage shown above.

Furthermore, to improve the execution performance of the processor itself, the execution frequency is increased in many cases to enhance the processing speed. However, in the case where the clock frequency is increased in order to enhance the processing speed, the power consumption of the processor increases in proportion to the increase in the clock frequency. In the case of, for instance, portable devices in which processors are incorporated in particular, decreasing power consumption has been an object to be attained, while improving the processing performance has been demanded also, and solving this dilemma in technologies has been a significant task.

Conventionally, to decrease power consumption, a technique has been used in which when processing of a plurality of cycles is required in a certain stage, the clock supply to the other stages is suspended. In this technique, when processing of a plurality of cycles is carried out at the EX stage, the clock supply to the DEC stage and the IF stage can be suspended so as to suspend the processing at the DEC and IF stages. Therefore, in the pipeline, it is possible to reduce the power consumption at the stages where the processing is suspended.

By the same technique, it also is possible to reduce power consumption by suspending the clock supply to the EX, DEC, and IF stages when multi-cycle processing is carried out at the MEM stage.

However, by the above-described conventional problem-solving method, the clock supply to the EX stage is suspended when multi-cycle processing is carried out at the MEM stage, and hence, an instruction present at the EX stage is suspended after it is shifted to the EX stage. Therefore, during a cycle period in which multi-cycle processing is carried out at the MEM stage, even if an instruction that requires multi-cycle processing at the EX stage is inputted, the execution of the multi-cycle instruction at the EX stage cannot be started unless the execution at the MEM stage has been finished. Therefore, a problem arises in which the instruction for the execution at the EX stage is not completed yet when the execution at the MEM stage is finished, and the instruction of the EX stage cannot be shifted to the MEM stage immediately after the execution is completed at the MEM stage.

Processing timings in the foregoing example will be described in detail below, with reference to FIG. 1. FIG. 1 illustrates a pipeline state in which an instruction A causing seven-cycle processing to be performed at the MEM stage and an instruction B causing five-cycle processing to be performed at the EX stage are performed continuously.

The instruction A and the instruction B are shifted to the DEC stage of the pipeline in cycles 1-1 and 1-2, respectively, and the processing of the instruction A at the MEM stage is started in a cycle 1-3. At the same time, the instruction B is shifted to the EX stage in the cycle 1-3.

Since the instruction A requires seven-cycle processing at the MEM stage, the execution of the instruction A causes a pipe lock at the MEM stage in a period of cycles 1-4. In the conventional technique, since the clock supply to the EX stage is suspended until the processing at the MEM stage is finished, the EX stage clock is stopped during the period of cycles 1-4, as shown in FIG. 1. Therefore, at the EX state where the instruction B is to be processed, the processing cannot be continued since the EX stage clock is stopped.

The clock supply to the EX stage is resumed in a cycle 1-5 when the execution of the instruction A at the MEM stage has been finished, and therefore, the execution of the instruction B at the EX stage is resumed in the cycle 1-5.

In the case where the clock is supplied continuously to the EX stage, the instruction B can be executed even while the instruction A causes the processing to be performed at the MEM stage, and it is possible to input the instruction B to the MEM stage in the cycle 1-5 when the instruction A is shifted to the WB stage. However, by the conventional technique for decreasing power consumption, the execution at the EX stage is not resumed unless the instruction A is shifted to the WB stage, and hence, this actually results in that the input to the MEM stage is carried out in a cycle 1-7.

In other words, to decrease power consumption, a process that impairs the execution efficiency in the pipeline processing is performed. Furthermore, the above-described suspension of clock supply is carried out every time any instruction is performed in hardware. Therefore, in the case where, considering the characteristic of the program processing, the processing should be executed with a performance equal to that of the normal operation without the stop of the clock, it is necessary to separately provide a means to instruct continuous clock supply.

SUMMARY OF THE INVENTION

Therefore, to solve the foregoing problems, it is an object of the present invention to provide a clock control method that allows power consumption to decrease without impairing the execution efficiency of the pipeline processing, and an information processing device employing the clock control method.

To attain the foregoing object, in an information processing device including a processing circuit that performs processing in synchronization with a clock, and a clock supply control circuit that controls supply of the clock to the processing circuit, a clock control method according to the present invention includes the operations of: extracting the number of cycles required since start of execution of processing in the processing circuit until output of a result of the processing; transferring the extracted number of cycles to the clock supply control circuit; starting the supply of the clock when the processing is started in the processing circuit; and stopping the supply of the clock to the processing circuit when the supply of the clock with the number of cycles is completed.

The foregoing configuration ensures the supply of a clock with the number of cycles required for processing, thereby avoiding unnecessary supply of a clock beforehand and reducing power consumption.

Furthermore, the clock control method according to the present invention preferably is arranged so that the number of cycles is not less than the minimum number of cycles since the start of execution of the processing until the output of the result of the processing, and is less than the number of cycles in the case where the clock is supplied at all times. The most significant effect can be achieved with the minimum number of cycles, but a similar effect can be expected as long as it is less than the number of cycles in the case where the clock is supplied at all times.

Next, to attain the above-described object, a clock control method according to the present invention is employed in an information processing device that includes first and second processing circuits that perform processing in synchronization with a clock and a clock supply control circuit that controls supply of the clock to the first processing circuit, and a result of the processing in the first processing circuit is inputted to the second processing circuit. The clock control method includes the operations of: extracting the number of cycles required since the start of execution of the processing in the first processing circuit until input of the result of the processing to the second processing circuit; transferring the extracted number of cycles to the clock supply control circuit; starting the supply of the clock when the processing is started in the first processing circuit; and stopping the supply of the clock to the first processing circuit after the supply of the clock with the number of cycles is completed.

Next, to attain the above-described object, a clock control method according to the present invention is employed in an information processing device that includes first and second processing circuits that perform processing in synchronization with a clock, and a clock supply control circuit that controls supply of the clock to the first processing circuit, in which a result of the processing in the first processing circuit is inputted to the second processing circuit. In the case where first processing and second processing are executed successively in the first processing circuit, the clock control method includes the operations of: (1) extracting the first number of cycles required for the execution of the processing in the first processing circuit; (2) transferring the first number of cycles to the clock supply control circuit; (3) starting the supply of the clock when the processing is started in the first processing circuit; (4) determining whether or not the second processing circuit can start processing when the supply of the clock with the first number of cycles is completed; (5) extracting a second number of cycles required for the execution of the second processing in the first processing circuit; (6) transferring the second number of cycles to the clock supply control circuit; (7) inputting a result of the processing in the first processing circuit to the second processing circuit in the case where it is determined at the operation (4) that the processing can be started; and (8) starting the supply of the clock with the second number of cycles to the first processing circuit so as to start the second processing in the first processing circuit, in the case where it is determined at the operation (4) that the processing can be started.

The foregoing configuration ensures the supply of a clock with the number of cycles required for processing, thereby avoiding unnecessary supply of a clock beforehand and reducing power consumption.

Next, to attain the above-described object, in an information processing device that is capable of pipeline processing of an instruction, a clock control method according to the present invention is characterized by including the operations of: extracting the number of cycles required for execution of an instruction at an execution stage; controlling the supply of a clock to a circuit belonging to the execution stage; and transferring the extracted number of cycles. In this method, the supply of the clock is carried out for the number of cycles since the start of the execution of the instruction at the execution stage.

With the foregoing configuration in which only the clock supply necessary for the execution cycle is carried out, it is possible to reduce power consumption without impairing the execution efficiency of the pipeline processing.

Furthermore, the clock control method according to the present invention preferably is arranged so that in the operation of extracting the number of cycles, as to each instruction, the number of execution cycles at the execution stage is specified, so that the number of execution cycles is extracted as the number of cycles simultaneously when an instruction code is decoded and a type of the instruction is determined.

Furthermore, the clock control method according the present invention preferably is arranged so that in the operation of extracting the number of cycles, a field for the number of cycles for execution (hereinafter referred to as execution cycle number field) is provided, which specifies the number of execution cycles at the execution stage with a bit code of the instruction, so that the number of execution cycles at the execution stage is extracted as the number of cycles from the execution cycle number field simultaneously when an instruction code is decoded and a type of the instruction is determined. This is because a circuit for storing the number of cycles for execution of each instruction or generating a clock for each instruction is unnecessary in the hardware, thereby reducing a scale of the decoder circuit itself, and hence decreasing the overall power consumption of the device.

Furthermore, the clock control method according to the present invention preferably is arranged so that in the operation of extracting the number of cycles, all instructions executed by the information processing device are divided into groups according to the numbers of execution cycles at the execution stage, group identification numbers are given to the groups, and a group identification number field in which the group identification number is set is provided in each instruction code, so that the group identification number is extracted and the number of execution cycles corresponding to the group identification number is extracted as the number of cycles from the group identification number field, simultaneously when the instruction code is decoded and a type of the instruction is determined. This is because a circuit for storing the number of execution cycles for each instruction or generating a clock for each instruction is unnecessary in the hardware, thereby reducing a scale of the decoder circuit itself, and hence decreasing the overall power consumption of the device.

Furthermore, the clock control method according to the present invention preferably is arranged so that in the operation of extracting the number of cycles, in the case where a variable-length instruction is processed, the number of execution cycles at the execution stage is specified as to each instruction word length of an instruction code, so that the number of execution cycles is extracted as the number of cycles from the instruction word length of the decoded instruction simultaneously when the instruction code is decoded and a type of the instruction is determined. This is because a circuit for storing the number of execution cycles for each instruction or generating a clock for each instruction is unnecessary in the hardware, thereby reducing a scale of the decoder circuit itself, and hence decreasing the overall power consumption of the device.

Next, to attain the above-described object, in an information processing device that is capable of pipeline processing of an instruction, a clock control method according to the present invention includes the operations of: extracting the number of cycles required for execution of an instruction at an execution stage; controlling supply of a clock to a circuit belonging to the execution stage; transferring the number of cycles; and selecting either starting the supply of the clock at start of the execution of the instruction at the execution stage or not. In this method, in the case where the starting of the supply of the clock is selected in the clock supply selecting operation, the supply of the clock with the number of cycles is started at the start of the execution of the instruction at the execution stage in the clock supply controlling operation.

In the foregoing configuration, since it is determined whether or not the clock supply is started when the execution of an instruction is started at the execution stage and the clock supply is only carried out when it is necessary, it is possible to reduce power consumption without impairing the execution efficiency of the pipeline processing.

Furthermore, the clock control method according to the present invention preferably is arranged so that in the clock supply selecting operation, a clock supply permission bit is provided in an instruction code that is indicative of whether or not the supply of the clock is to be started at the start of the execution of the instruction at the execution stage, so that information on whether or not the supply of the clock is to be started is extracted from the clock supply permission bit upon decoding of the instruction code. Since whether or not the clock supply should be started can be judged from the clock supply permission bit, there is no need to determine the necessity of the clock supply in the hardware, and therefore, the power consumption can be reduced for this.

Furthermore, the clock control method according to the present invention preferably is arranged to analyze the dependence relationship between a first instruction and a second instruction that are successive instructions, and in the case where the second instruction refers to an execution result of the first instruction, the clock supply permission bit is set in an ON state. This is to ensure the clock supply for the second instruction immediately after completion of the execution of the first instruction that has a dependence relationship with the second instruction.

To attain the above-described object, in an information processing device capable of pipeline processing of an instruction, a clock control method according to the present invention includes the operations of: extracting the number of cycles required for execution of an instruction at an execution stage; controlling supply of a clock to the circuit belonging to the execution stage; transferring the number of cycles; selecting either starting the supply of the clock at start of the execution of the instruction at the execution stage or not; and determining a state of a stage next to the execution stage. In this method, in the case where the starting of the supply of the clock is selected in the clock supply selecting operation and it is determined in the next stage state determining operation that the next stage is ready for execution, the supply of the clock with the number of cycles is started at the start of the execution of the instruction at the execution stage in the clock supply controlling operation.

In the foregoing configuration, since it is determined whether or not the clock supply should be started when the execution of an instruction is started at the execution stage and the clock supply is carried out according to the state of the next stage, it is possible to reduce power consumption without impairing the execution efficiency of the pipeline processing.

Furthermore, the clock control method according to the present invention further is arranged so that the clock supply selecting operation includes a sub-operation of determining a state of the first instruction being executed at the stage next to the execution stage, and the dependence relationship between a second instruction to be executed at the execution stage and the first instruction. In this method, in the case where the second instruction is dependent on an execution result of the first instruction, not starting the supply of the clock with the number of cycles required for execution of the second instruction at the execution stage before completion of the execution of the first instruction is selected, and in the case where it is not dependent thereon, carrying out the supply of the clock with the number of cycles required for the execution at the execution stage is selected. This is to prevent the execution of the second instruction from being carried out before the execution of the first instruction is completed when these instructions have a dependence relationship.

Next, to attain the above-described object, in an information processing device capable of pipeline processing of an instruction, a clock control method according to the present invention includes the operations of: extracting the number of cycles required for execution of an instruction at an execution stage; controlling supply of a clock to a circuit belonging to the execution stage; transferring the number of cycles; selecting either starting the supply of the clock at start of the execution of the instruction at the execution stage or not; and detecting completion of execution of instructions at all stages behind the execution stage. In this method, in the case where the starting of the supply of the clock is selected in the clock supply selecting operation and it is detected that the execution of instructions is completed at all the stages behind the execution stage, the supply of the clock with the number of cycles is started at the start of the execution of the instruction at the execution stage in the clock supply controlling operation.

In the foregoing configuration, it can be determined whether the clock supply should be started when the execution of an instruction is started at the execution stage. Besides, in the case where a program can be executed with a lower execution efficiency of the pipeline processing, power consumption can be reduced.

Furthermore, the clock control method according to the present invention preferably is arranged so that the supply of the clock to each of the stage is controllable at each of the stages in the pipeline, and the supply of the clock to each of the stages can be suspended except when an instruction is being executed at each of the stages. This is because an unnecessary clock supply can be avoided.

Furthermore, the clock control method according to the present invention preferably is arranged so that in the case where a low-speed operation bit is provided in an instruction code and an instruction in which the low-speed operation bit is set is executed at the execution stage, the supply of the clock with the number of cycles is started after it is detected that execution of a preceding instruction is completed at all the stages behind the execution stage. This is because in the processing that does not require a high-speed operation, the low-speed operation bit allows the power consumption required for the processing to be reduced.

Furthermore, the clock control method according to the present invention preferably is arranged so that an execute-form code is generated according to a program described in a high-level language, and the method preferably further includes an operation of specifying whether or not a low-speed operation is to be carried out, with program description in the high-level language. In this method, in the case where the program description that specifies with the high-level language that the low-speed operation is to be carried out is converted into an execute-form code, a clock supply start permission bit is set in an ON state. Since the processor does not have to detect a state of power consumption dynamically, there is not need to provide a detecting circuit in hardware, thereby achieving an effect of reducing power consumption.

Next, to attain the above-described object, an information processing device according to the present invention is characterized by employing the above-described clock control method.

This configuration allows an effect of reduction of power consumption without impairing execution performance of a processor that executes pipeline processing. Besides, this allows the number of cycles of the execution to be defined in an instruction code, thereby suppressing an increase in hardware resources, and hence, achieving an effect of reducing power consumption.

BRIEF DESCRIPTION OF THE DRAWINGS

FIGS. 7A and 7B are diagrams for comparison of a pipeline effect in the clock control system according to the third embodiment.

FIG. 10 is a view illustrating a configuration of an instruction code used in the clock control method according to the sixth embodiment of the present invention.

FIG. 11 is a view illustrating an example of a program used in the clock control method according to the sixth embodiment of the present invention.

FIG. 12 is a view illustrating a configuration of an instruction code used in a clock control method according to a seventh embodiment of the present invention.

DETAILED DESCRIPTION OF THE INVENTION

First Embodiment

Figure 1:
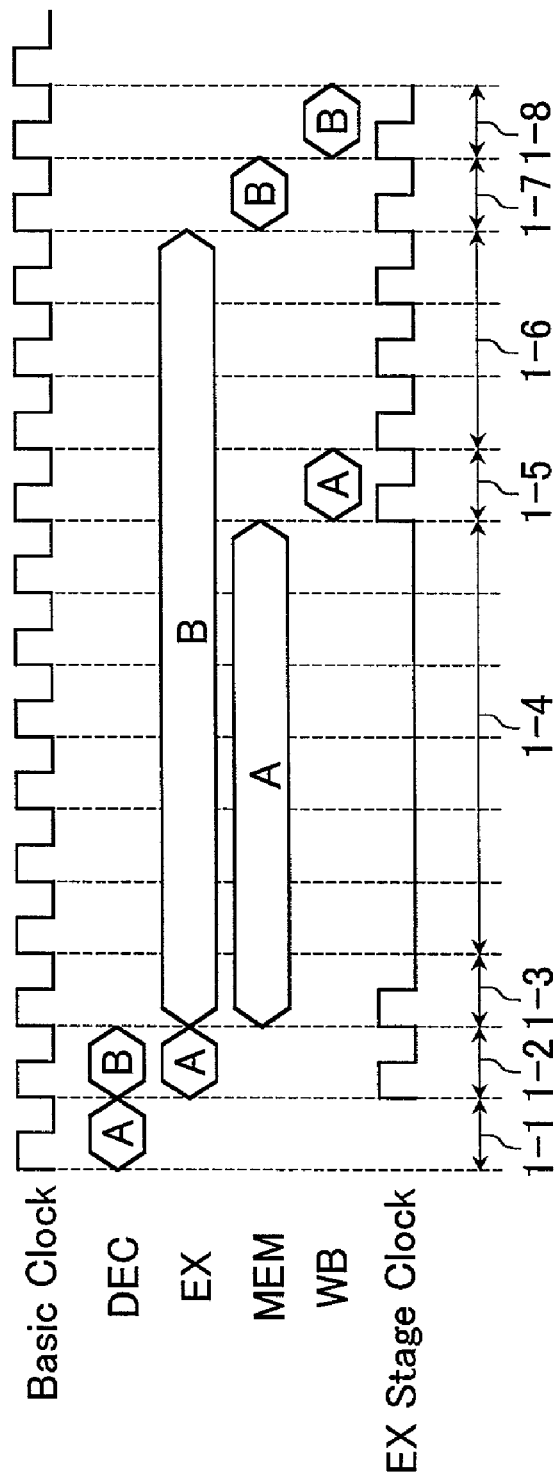
FIG. 1 is a clock supply timing chart of a conventional clock control method.
Figure 2:
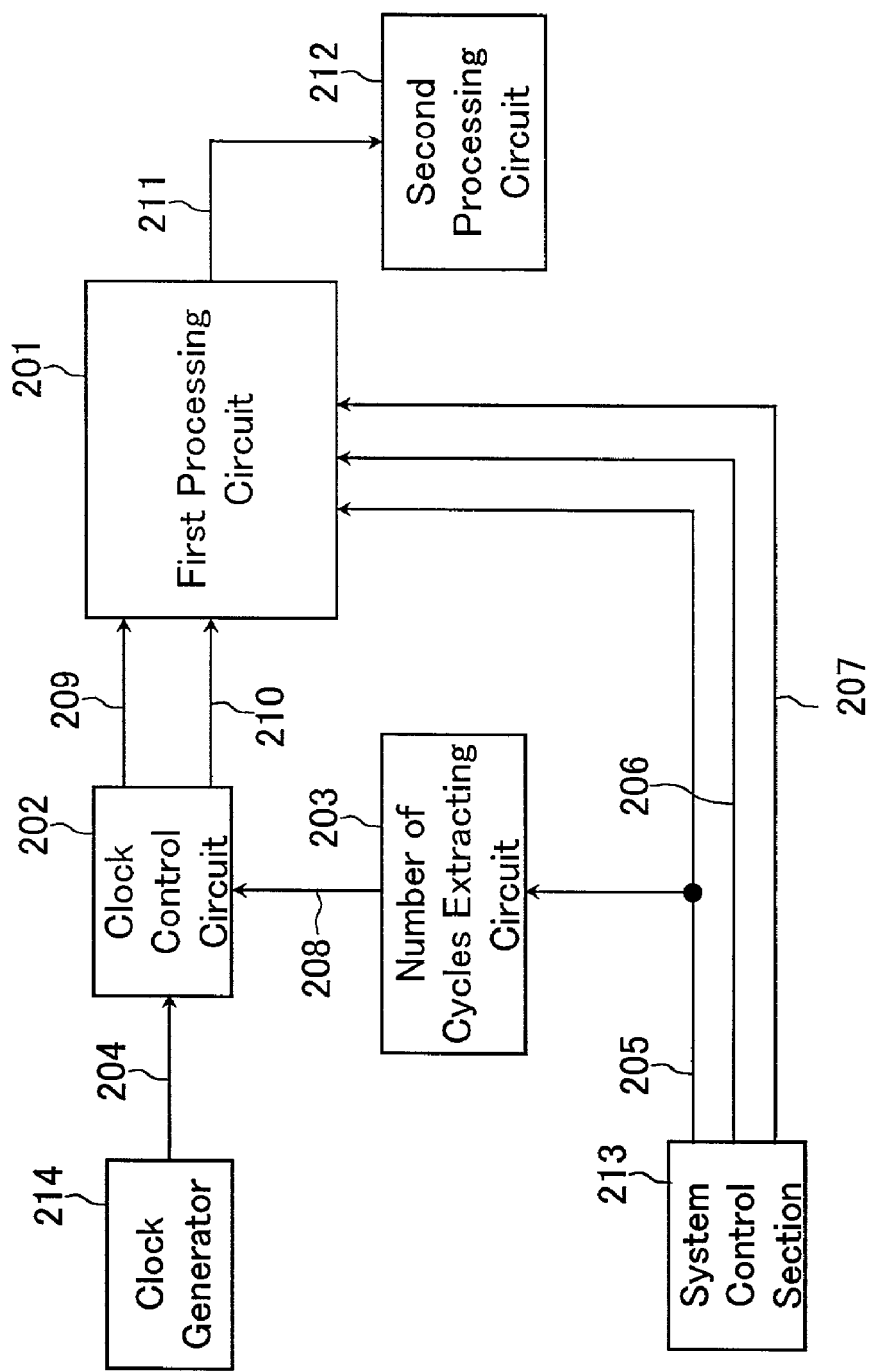
FIG. 2 is a view illustrating a system configuration of an information processing device employing a clock control method according to a first embodiment of the present invention.

The following description will depict an information processing device employing a clock control method according to the first embodiment of the present invention, while referring to the drawings. FIG. 2 illustrates a system configuration of an information processing device employing a clock control method according to the first embodiment of the present invention.

In FIG. 2, 201 denotes a first processing circuit that performs processing in synchronization with a clock. 202 denotes a clock control circuit that controls the clock for the first processing circuit 201. 203 denotes a number of cycles extracting circuit. 204 denotes a clock to be inputted to the clock control circuit 202. 208 denotes the number of cycles extracted by the number of cycles extracting circuit 203. 214 denotes a clock generator for generating the clock 204. 209 denotes a processing circuit clock to be inputted from the clock control circuit 202 to the processing circuit 201. 210 denotes a clock end signal indicative of a final cycle of a clock.

Furthermore, 205 denotes an instruction to the first processing circuit 201. 206 denotes a request to the first processing circuit 201. 207 denotes input data inputted to the first processing circuit 201. These are outputted from a system control section 213. Furthermore, 211 denotes output data from the first processing circuit 201. 212 denotes a second processing circuit that operates on the output data 211 as a new input.

Figure 3:
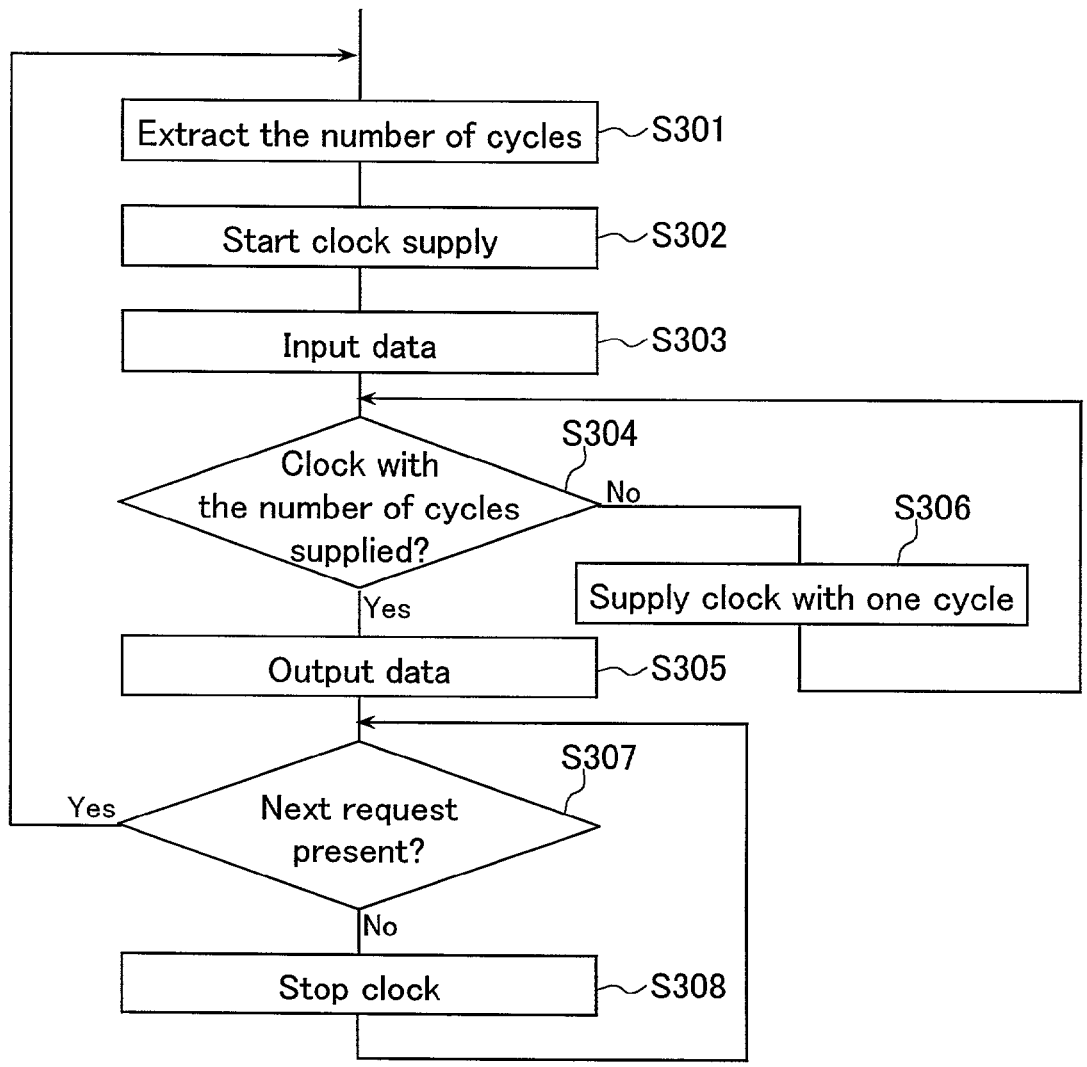
FIG. 3 is a flowchart illustrating processing in the information processing device employing the clock control method according to the first embodiment of the present invention.

FIG. 3 is a flowchart illustrating the processing in an information processing device employing the clock control method according to the first embodiment. In FIG. 3, in the case where the system control section 213 has an instruction and a request for processing in the first processing circuit 201, the number of cycles necessary for the processing in the first processing circuit 201 is extracted at an operation for extracting the number of cycles (operation 301).

Next, the clock supply to the first processing circuit 201 is started (operation 302), while data are inputted thereto (operation 303). Then, whether or not the clock supply with the number of cycles extracted at the operation 301 has been finished is determined (operation 304). In the case where it is determined that the clock supply is not finished (operation 304: No), the clock of the next one cycle are outputted (operation 306). After the operation 306, the operation 304 is repeated again.

In the case where it is determined that the clock supply with the number of cycles extracted at the operation 304 is finished (operation 304: Yes), it is considered that the processing at the first processing circuit 201 is completed, and data are outputted (operation 305).

Subsequently, whether or not an instruction to be processed next is present is determined (operation 307). In the case where a next instruction is present (operation 307: Yes), processing is performed again starting with the operation 301, whereas in the case where no more instruction is present (operation 307: No), the clock supply from the clock control circuit 202 is suspended (operation 308), and the operation 307 is repeated until a next instruction is shifted thereto.

Figure 4:
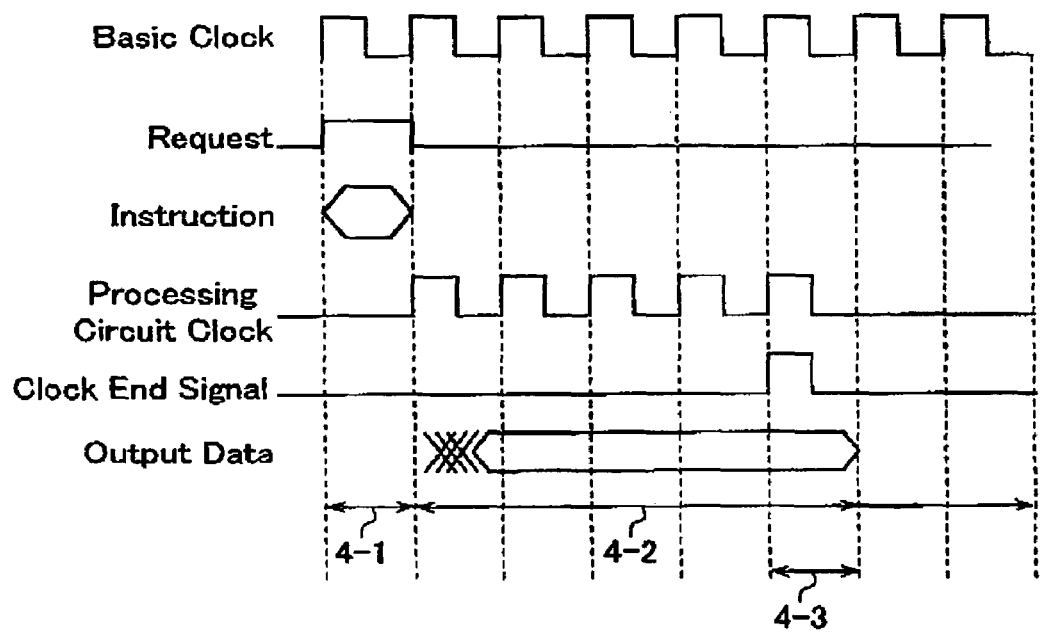
FIG. 4 is a clock supply timing chart of the information processing device employing the clock control method according to the first embodiment of the present invention.

FIG. 4 illustrates a timing chart of the clock supply. In FIG. 4, when a request and an instruction are generated in a cycle 4-1, the number of cycles required for the processing is extracted, and supply of a processing circuit clock is started. It should be noted that FIG. 4 illustrates a case where the processing is performed in five cycles.

More specifically, since the processing is performed in five cycles, five cycles of a processing circuit clock are supplied (cycle 4-2), and thereafter, the supply of the processing circuit clock is suspended.

At the final cycle 4-3 of the clock supply, the clock end signal is outputted, and data about the processing results are outputted from the first processing circuit 201. Alternatively, the output of data at the cycle in which the clock end signal is outputted is determined to be effective.

As described above, according to the first embodiment of the present invention, in the case where the system control section 213 has an instruction or a request to the first processing circuit 201, the number of cycles required for the processing in the first processing circuit 201 is extracted beforehand, and the clock with only the number of cycles is supplied. This makes it possible to avoid unnecessary clock supply beforehand.

Second Embodiment

The following description will depict an information processing device employing a clock control method according to the second embodiment of the present invention, while referring to the drawings. The description of the second embodiment depicts a clock control method in the case where the first processing circuit performs first and second processing successively. In FIG. 2, the first processing circuit 201 outputs data to the second processing circuit 212 when completing the processing, and the first processing circuit 201 starts the second processing when the second processing circuit 212 starts processing.

Figure 16:
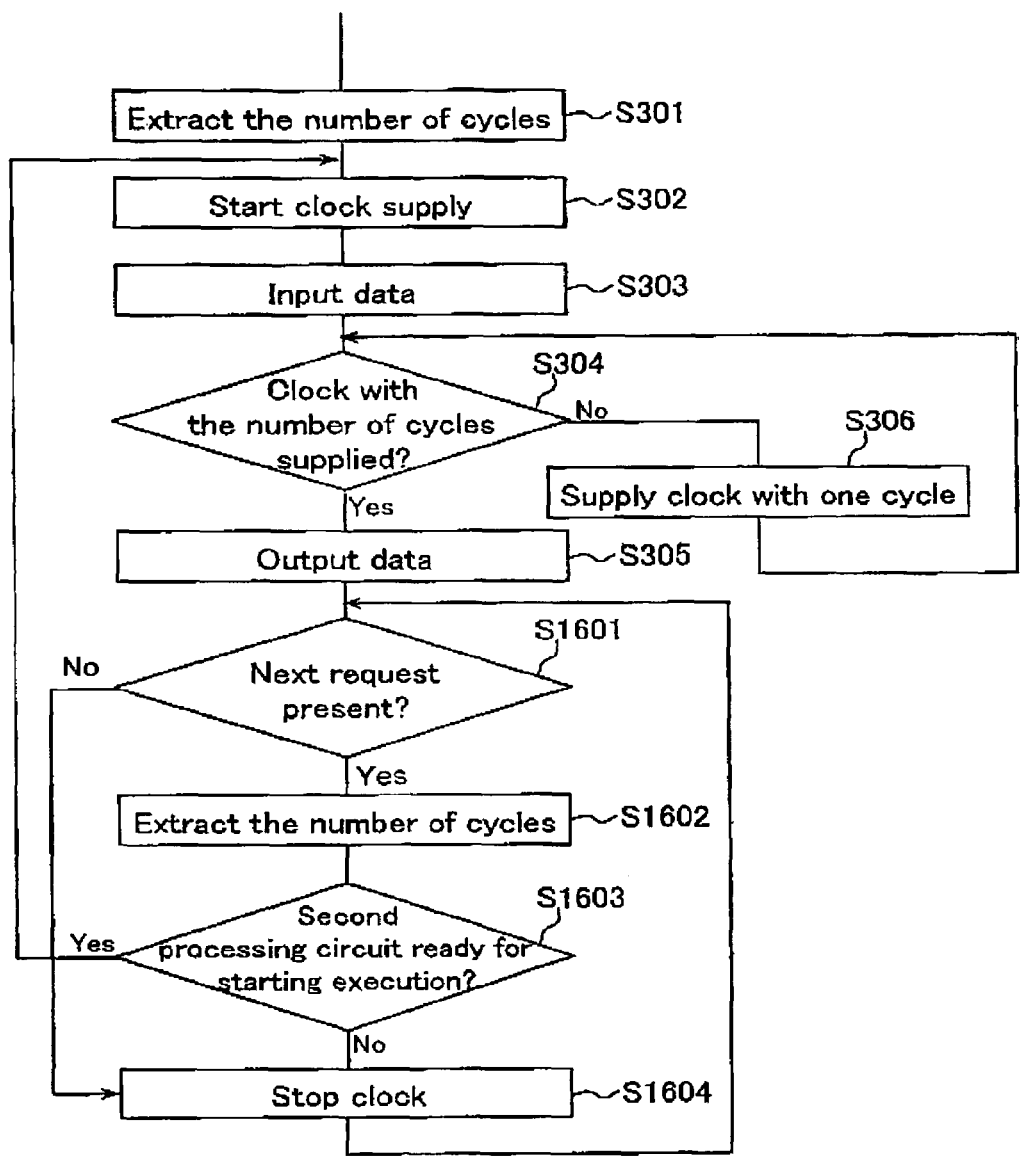
FIG. 16 is a flowchart illustrating processing in the information processing device employing the clock control method according to the second embodiment of the present invention.

FIG. 16 is a flowchart of processing performed by the first processing circuit in the information processing device employing the clock control method according to the second embodiment of the present invention. In FIG. 16, when the system control section 213 has an instruction and a request for processing in the first processing circuit 201, the number of cycles necessary for the processing in the first processing circuit 201 is extracted (operation 301).

Next, the clock supply to the first processing circuit 201 is started (operation 302), while data are inputted thereto (operation 303). Then, in the case where it is determined that the clock supply with the number of cycles extracted at the operation 301 has not been finished yet (operation 304: No), the clock of the next one cycle is outputted (operation 306), and the operation 304 is repeated until the number of cycles of the outputted clock reaches the extracted number of cycles.

In the case where it is determined that the clock supply with the number of cycles extracted at the operation 304 is finished (operation 304: Yes), it is considered that the processing at the first processing circuit 201 is completed, and data are outputted (operation 305).

Subsequently, whether a next request to the first processing circuit 201 is present is determined (operation 1601). In the case where it is determined that no request is present (operation 1601: No), the clock supply is stopped (operation 1604), and the clock supply remains suspended until another request is inputted.

In the case where a next request is present (operation 1601: Yes), the number of cycles required for the next request is extracted (operation 1602), and it is determined whether the second processing circuit 212 can start processing with respect to the data that are being outputted from the first processing circuit 201 as new input (operation 1603).

In the case where it is determined that the second processing circuit 212 can start processing (operation 1603: Yes), the second processing circuit 212 takes in the data outputted from the first processing circuit 201 and starts processing, while the first processing circuit 201 returns to the operation 302 and executes processing for a next request.

In the case where it is determined that the second processing circuit 212 is not available for processing (operation 1603: No), the clock supply is suspended until the second processing circuit 212 becomes available for the processing with the data that are being outputted from the first processing circuit 201 (operation 1604).

Figure 17:
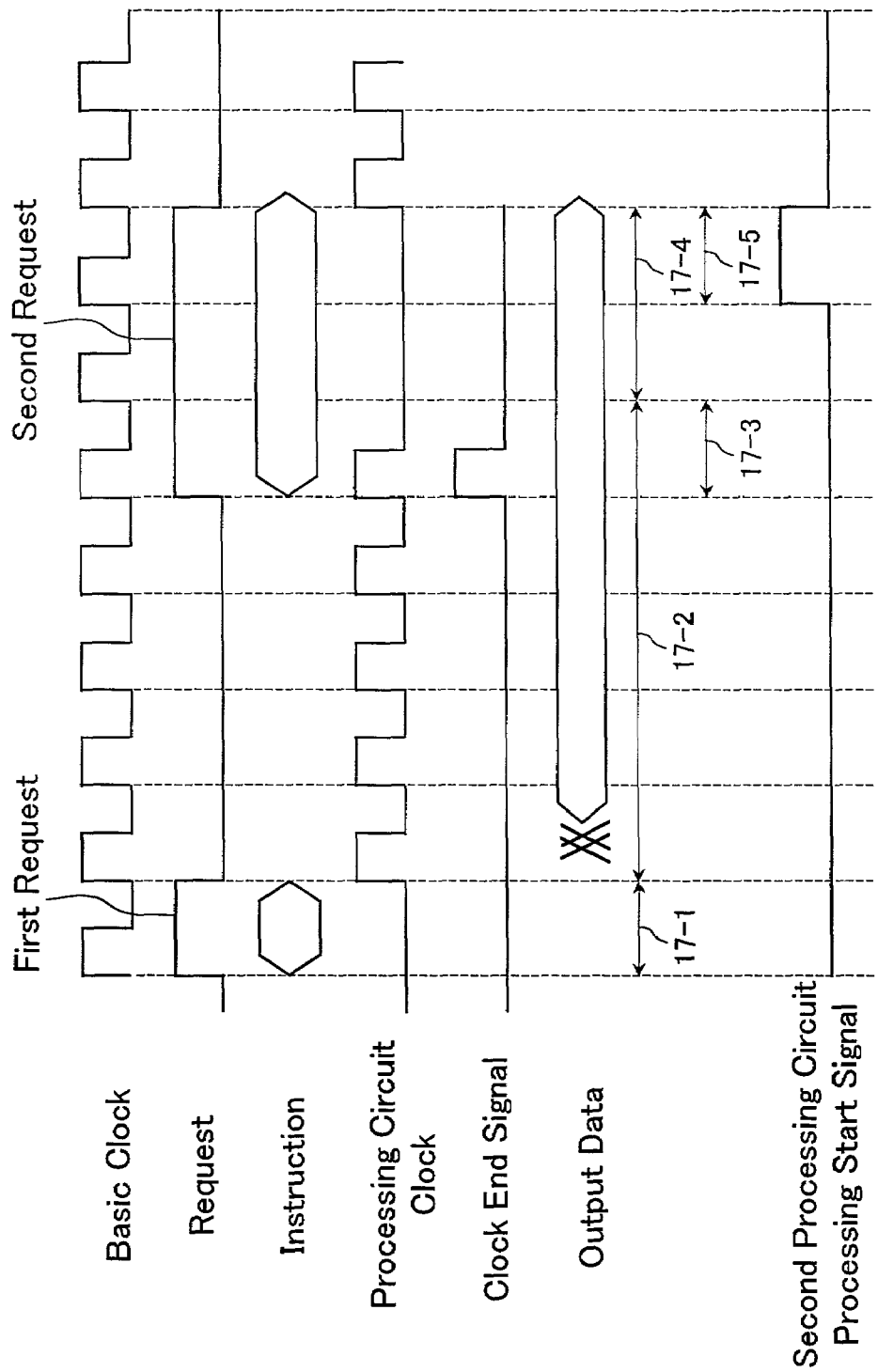
FIG. 17 is a clock supply timing chart of the information processing device employing the clock control method according to the second embodiment of the present invention.

Subsequently, FIG. 17 is a timing chart of the clock supply in an information processing device employing the clock control method according to the second embodiment of the present invention. In FIG. 17, when a request and an instruction are generated at a cycle 17-1, the number of cycles required for the processing is extracted, and the clock supply to a processing circuit is started.

It should be noted that FIG. 17, as FIG. 4, illustrates a case where the processing is performed in five cycles. More specifically, since the processing is performed in five cycles, the clock with five cycles is supplied as shown in a period of cycles 17-2, and the supply of the processing circuit clock is suspended when the clock supply for five cycles is completed. At a final cycle 17-3 of the processing circuit clock, a clock end signal is outputted, and data are shifted from the first processing circuit 201 to the second processing circuit 212.

At the final cycle 17-3 of the processing circuit clock, it is determined whether the second processing circuit 212 can start processing. FIG. 17 illustrates a case where the second processing circuit 212 cannot start processing at the cycle 17-3, but can start processing at a cycle 17-5.

More specifically, until the second processing circuit 212 outputs a processing start signal at the cycle 17-5, even with next request and instruction inputted to the first processing circuit 201, the first processing circuit 201 does not start execution of the same, and the clock supply remains suspended. Furthermore, even if a second request is inputted to the first processing circuit 201 at the cycle 17-3, the first processing circuit 201 does not start executing the processing in response to the second request during a period of cycles 17-4 since the completion of the supply of the processing circuit clock until the cycle 17-5 at which the second processing circuit can start processing. During the period of cycles 17-4, only extraction of the number of cycles necessary for the processing in response to the second request in the first processing circuit 201 is executed.

Then, when the second processing circuit 212 becomes available for processing at the cycle 17-5, the second processing circuit 212 starts processing with the data outputted from the first processing circuit 201, and at the same time, the first processing circuit 201 starts processing as to the second request and instruction. At the cycle 17-5, as at the cycle 17-1, the first processing circuit 201 is supplied with the clock with only the number of cycles necessary for the processing.

As described above, according to the second embodiment, the first processing circuit is allowed to execute next processing even when the second processing circuit is performing processing, and this makes it possible to avoid unnecessary clock supply beforehand.

Third Embodiment

Figure 5:
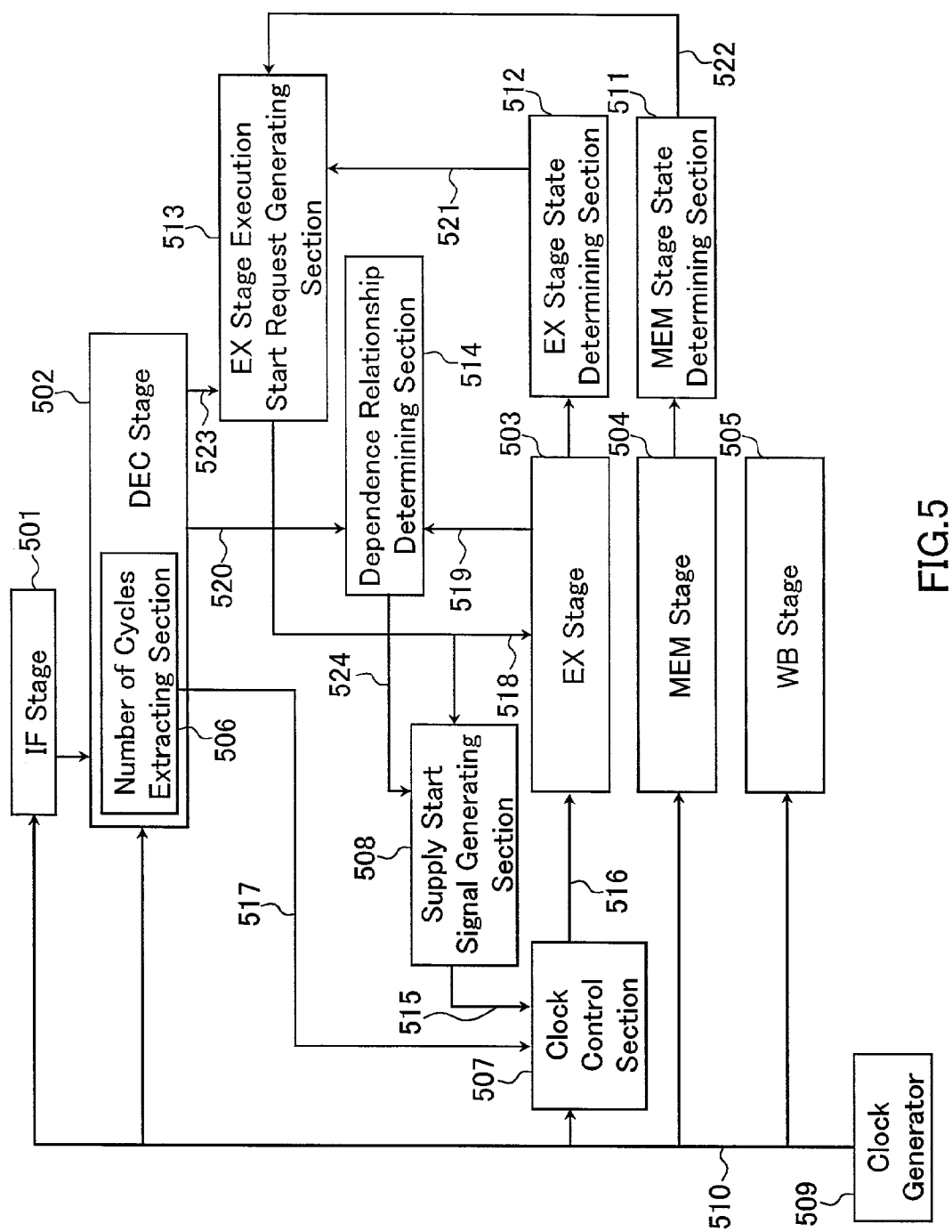
FIG. 5 is a view illustrating a configuration of a processor in an information processing device employing a clock control method according to a third embodiment of the present invention.

The following description will depict a clock control system according to the third embodiment of the present invention, while referring to the drawings. FIG. 5 illustrates a configuration of a processor that performs pipeline processing employing the clock control system according to the third embodiment; the processor performs the extraction of the number of execution cycles at the EX stage with an instruction decoder.

FIG. 5 illustrates a processor of a standard five-stage pipeline structure. In FIG. 5, a clock 510 is supplied from a clock generator 509 to an IF stage 501, a DEC stage 502, an MEM stage 504, and a WB stage 505. The EX stage 503 is supplied with an EX stage clock 516, which is the clock 510 having been subjected to control by a clock control section 507.

The DEC stage 502 incorporates a number of cycles extracting section 506 that extracts the number of cycles required for execution of an instruction at the EX stage 503. The clock control section 507 outputs the number of cycles 517 that is extracted by the number of cycles extracting section 506 in the DEC stage 502, and supplies the EX stage 503 with the number of cycles needed in the EX stage 503.

The EX stage 503 and the MEM stage 504 are provided with an EX stage state determining section 512 and an MEM stage state determining section 511, respectively, for determining instruction execution states at the stages, respectively, and they shift an EX stage determination result 521 and an MEM stage determination result 522 to an EX stage execution start request generating section 513.

Upon supply of a request 523 from the DEC stage 502, the EX stage execution start request generating section 513 outputs an execution start signal 518 to the EX stage 503, when it determines from the EX stage determination result 521 and the MEM stage determination result 522 that it is possible to input an instruction to the EX stage 503. Further, the execution start signal 518 is inputted to the clock control section 507 also.

A dependence relationship determining section 514 determines a dependence relationship between an instruction at the DEC stage and an instruction at the EX stage based on DEC instruction information 520 as information on an instruction present at the DEC stage 502 and EX instruction information 519 as information on an instruction present at the EX stage 503, and outputs a dependence determination result 524. In the case where an instruction to be shifted to the EX stage does not have a dependence relationship with a preceding instruction, judging from the execution start signal 518 and the dependence determination result 524, a supply start signal generating section 508 outputs a supply start signal 515 to the clock control section 507.

Figure 6:
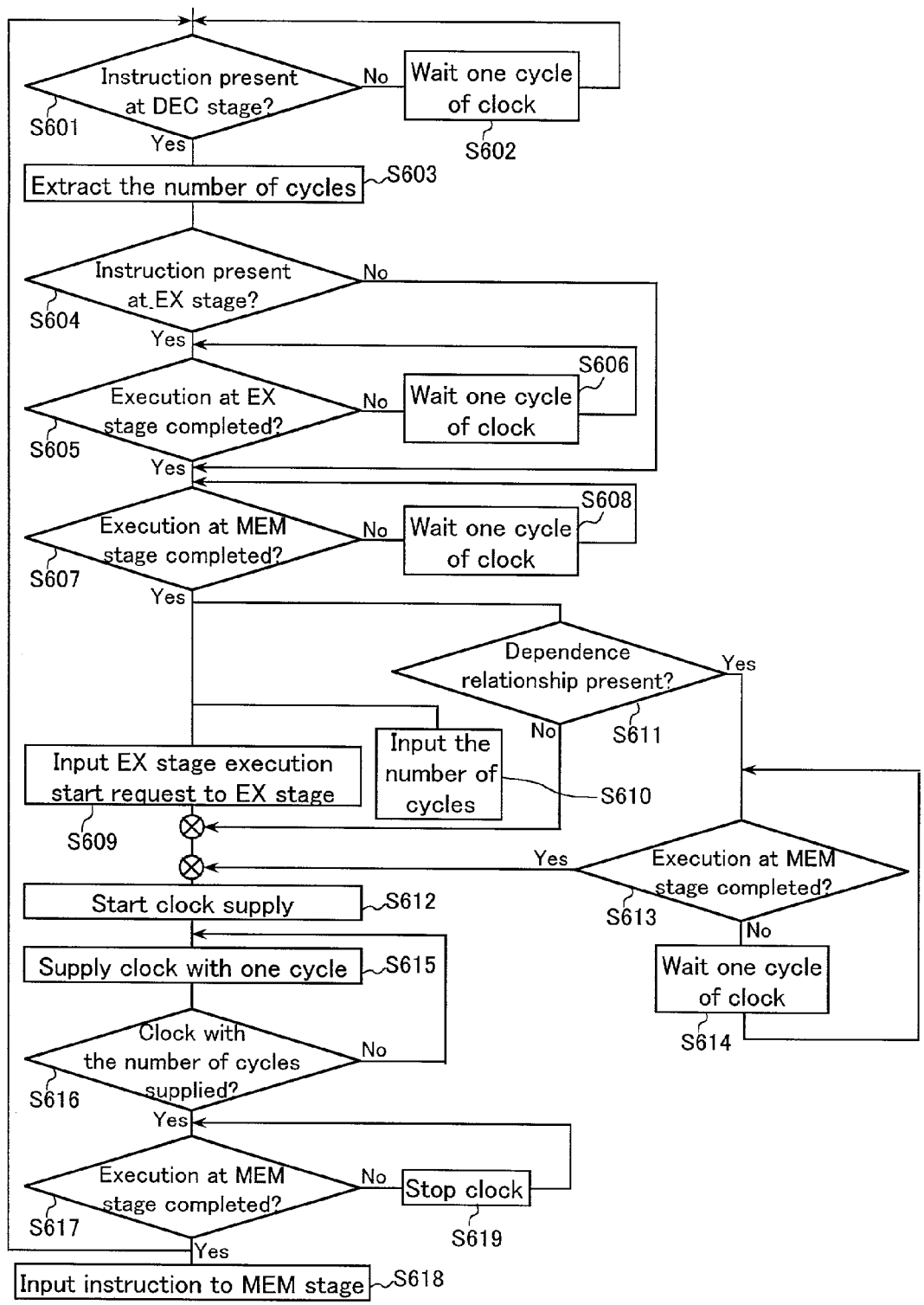
FIG. 6 is a flowchart illustrating processing in the information processing device employing the clock control method according to the third embodiment of the present invention.

FIG. 6 is a flowchart of processing in the execution of an instruction and the clock supply. FIG. 6 illustrates a flow of processing at the DEC stage and the EX stage.

First of all, whether an instruction is present at the DEC stage is checked (operation 601). In the case where no instruction is present (operation 601: No), a wait for one clock cycle is provided (operation 602). In the case where an instruction is present (operation 601: Yes), the number of execution cycles at the EX stage is extracted with respect to the decoded instruction (operation 603).

Next, whether the instruction can be shifted to the EX stage is determined. First of all, whether any preceding instruction is present at the EX stage is checked (operation 604), and in the case where a preceding instruction is present (operation 604: Yes), whether the execution of the instruction has been completed is determined (operation 605). In the case where it is determined at the operation 605 that the execution is not completed (operation 605: No), a wait for only one clock cycle is provided (operation 606). In the case where it is determined that the execution is completed (operation 605: Yes), whether the execution of the same at the MEM stage is completed is checked (operation 607).

In the case where it is determined at the operation 607 that the execution has not been completed yet (operation 607: No), a wait for only one clock cycle is provided (operation 608). In the case where it is determined that the execution has been completed (operation 607: Yes), it is determined that the instruction can be shifted to the EX stage, and a request for an execution start at the EX stage is outputted so that the instruction is shifted to the EX stage (operation 609). At the same time, the number of cycles to be supplied to the EX stage is supplied to the clock control section (operation 610). Furthermore, presence/absence of dependence relationship between the preceding instruction and the instruction to be executed in the EX stage currently is confirmed (operation 611).

In the case where it is determined at the operation 611 that there is no dependence relationship (operation 611: No) and an EX stage execution start request is issued at the operation 609, the clock supply is started (operation 612).

In the case where the instruction is shifted to the EX stage but this instruction to be executed at the EX stage depends on the preceding instruction, in other words, in the case where the instruction to be executed at the EX stage is to refer to execution results at the MEM stage of an instruction currently executed at the MEM stage, the execution of the instruction at the EX stage cannot be started.

Therefore, in the case where it is determined at the operation 611 that there is a dependence relationship (operation 611: Yes), since the preceding instruction is executed at the MEM stage, an execution state at the MEM stage is determined, and whether the execution has been completed at the MEM stage is determined (operation 613). In the case where it is determined at the operation 613 that the execution has been completed (operation 613: Yes), the clock supply is started at operation 612. In the case where it is determined that the execution has not been completed yet (operation 611: No), a wait for only one clock cycle is provided (operation 614).

When the clock supply is started at the operation 612, the clock of one cycle is supplied to the EX stage (operation 615), and then it is determined whether the clock supply with the number of cycles extracted by the number of cycles extracting section has been completed (operation 616). In the case where the clock supply is not completed (operation 616: No), the clock is outputted again at the operation 615.

In the case where it is determined at the operation 616 that the clock supply has been completed (operation 616: Yes), by checking the state of the MEM stage, whether the execution of the instruction at the MEM stage has been completed is determined (operation 617). In the case where the execution has been completed (operation 617: Yes), the instruction is shifted to the MEM stage (operation 618), and a result of the execution at the EX stage is shifted to the MEM stage. Then, the processing is repeated starting with the operation 601 so that the next instruction is shifted to the EX stage.

In the case where it is determined at the operation 617 that the execution has not been completed (operation 617: No), the clock supply is suspended (operation 619), and a wait is provided until the execution at the MEM stage has been completed.

The processing as described above provides an effect as shown in FIGS. 7A and 7B. FIGS. 7A and 7B illustrate a pipeline state in the case where an instruction A and an instruction B are executed successively with a conventional technique, and a pipeline state in the case where the same are executed by the clock control method according to the second embodiment.

It should be noted that the instruction A requires seven cycles for the execution at the MEM stage due to memory access penalty, and the instruction B requires five cycles for the execution at the EX stage.

First of all, FIG. 7A illustrates a pipeline state in the case where the clock control method according to the second embodiment is used, and FIG. 7B illustrates a pipeline state in the case where the conventional clock control method is used.

The instruction A is shifted to the MEM stage at a cycle 7-2 so as to be executed. Assume that, however, the execution of the same requires seven cycles due to memory penalty, and at this point of time, the instruction B has been shifted to the EX stage.

According to the conventional technique, as shown in FIG. 7B, the clock supply is suspended at the EX stage in the case where a wait state is provided at the MEM stage. Therefore, even if the instruction B is shifted to the EX stage at a cycle 7-2, the clock supply is not carried out during a period from the cycle 7-2 to a cycle 7-8.

More specifically, as is with the EX clock shown in FIG. 7B, when the execution of the instruction A at the MEM stage finishes at the cycle 7-8 and the instruction A is shifted to the WB stage, the clock supply to the EX stage is resumed and the execution of the instruction B at the EX stage is resumed at a cycle 7-9. Therefore, according to the conventional technique, an execution cycle period in which the instruction B is executed is a period from the cycle 7-2 until a cycle 7-11.

Thus, in spite of the instruction A having been shifted to the WB stage at the cycle 7-9 and the MEM stage being ready to accept an input of a next instruction, the instruction B cannot be shifted to the MEM stage since the execution of the instruction B has not been completed at the EX stage. Actually, the instruction B is shifted to the MEM stage at a cycle 7-11, that is, after the execution of the instruction B has been completed.

On the other hand, in the case of the clock control method according to the third embodiment, as shown in FIG. 7A, since the clock with the number of cycles required for the execution of the instruction B at the EX stage is supplied to the EX stage even during a period from the cycle 7-2 to the cycle 7-8 while the instruction A is executed for seven cycles at the MEM stage, the clock is supplied to the EX stage during a period from the cycle 7-2 to the cycle 7-6 as well.

More specifically, even in the case where the MEM stage is in a wait state due to the execution of the instruction A, it is possible to execute an instruction at the EX stage, and hence, the execution cycle period in which the instruction B is executed is a period denoted as 7-15. Thus, it is possible to finish the execution earlier than conventionally. Furthermore, the clock is not supplied to the EX stage during a period denoted as 7-16, which is wait cycles until the instruction B is shifted to the MEM stage. This makes it possible to avoid unnecessary power consumption during cycles of the wait state.

What is important is that the instruction B can be shifted to the MEM stage at the cycle 7-9 when the instruction A is shifted to the WB stage. This results in that the number of cycles while the instruction B remains at the MEM stage being decreased by the cycle period denoted as 7-17, as compared with the conventional clock control method. Furthermore, in the case of the execution of the instruction A and the instruction B in the example shown in FIGS. 7A and 7B, the pipeline state shown in FIG. 7A becomes identical to a state in the case where the clock is supplied permanently to the EX stage.

As described above, according to the third embodiment, the clock with the necessary number of cycles is supplied so that the EX stage makes a transition to a wait state after the execution of the instruction has been completed, and the clock can be suspended in the case where it is in a wait state. Therefore, it is possible to achieve an effect of reduction of power consumption without impairing the efficiency of the pipeline execution.

Fourth Embodiment

Figure 8:
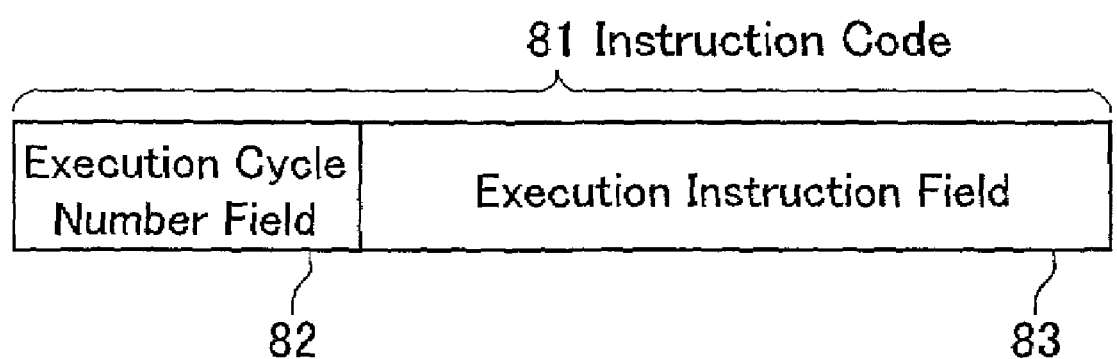
FIG. 8 is a view illustrating a configuration of an instruction code used in a clock control method according to a fourth embodiment of the present invention.

The following description will depict the fourth embodiment of the present invention while referring to the drawings. FIG. 8 is a view illustrating an example of an instruction code itself in a clock control method according to the fourth embodiment.

In the fourth embodiment, an instruction code 81 includes an execution cycle number field 82 indicative of the number of cycles required at the EX stage, and the number of cycles is extracted from the execution cycle number field 82 upon the instruction decoding.

The instruction code 81 is composed of an instruction bit field 83 as an actual execution instruction code, and an execution cycle number field 82 indicative of the number of cycles required for the execution of the instruction at the execution stage.

At the IF stage, the instruction fetching is carried out so that the instruction code 81 is fetched from read-out data. At the DEC stage, the instruction code 81 decodes an instruction from the instruction bit field 83, and extracts, from the execution cycle number field 82, the number of cycles required for executing the instruction at the EX stage. It should be noted that an actual number of cycles may be set in the execution cycle number field 82, or alternatively, it may be divided into groups and identification numbers of the groups may be set therein.

For instance, instructions may be grouped according to the number of cycles and group numbers may be set as follows: an instruction requiring one cycle for execution at the EX stage is allocated in a group 1, an instruction requiring three cycles is allocated in a group 2, and an instruction requiring 10 cycles is allocated in a group 3. In a decoder circuit, based on the group number set in the execution cycle number field 82, a number of cycles corresponding to the group number is generated and is supplied to the clock control section of the EX stage.

As described above, according to the fourth embodiment, a circuit for storing or generating each of the numbers of cycles for executing instructions is unnecessary in terms of hardware in a decoding circuit of an instruction decoder, thereby making it possible to reduce the scale of the decoder circuit itself as compared with the case of the second embodiment.

Fifth Embodiment

The following description will depict the fifth embodiment of the present invention, while referring to the drawings. The fifth embodiment relates to a method in which the number of cycles for execution is extracted based on a length of an instruction word of a variable-length instruction in a processor that processes variable-length instructions.

Assume that at the EX stage, a first instruction requires one cycle for execution thereof, a second instruction, three cycles, and a third instruction, five cycles. In this case, it is defined that an instruction code of the first instruction has one byte, an instruction code of the second instruction has three bytes, and an instruction code of the third instruction has five bytes.

In the case where the variable-length instruction code is decoded at the DEC stage, the instruction word length has to be determined. In the case where the execution cycle is defined as to each instruction word length as described above, it is possible to extract the number of cycles for executing an instruction when the variable-length instruction is taken out of instruction data for decoding the instruction and the instruction word length is determined.

As described above, according to the fifth embodiment, as in the fourth embodiment, it is possible to reduce the scale of the decoder circuit itself as compared with the case of the third embodiment.

Sixth Embodiment

Figure 9:
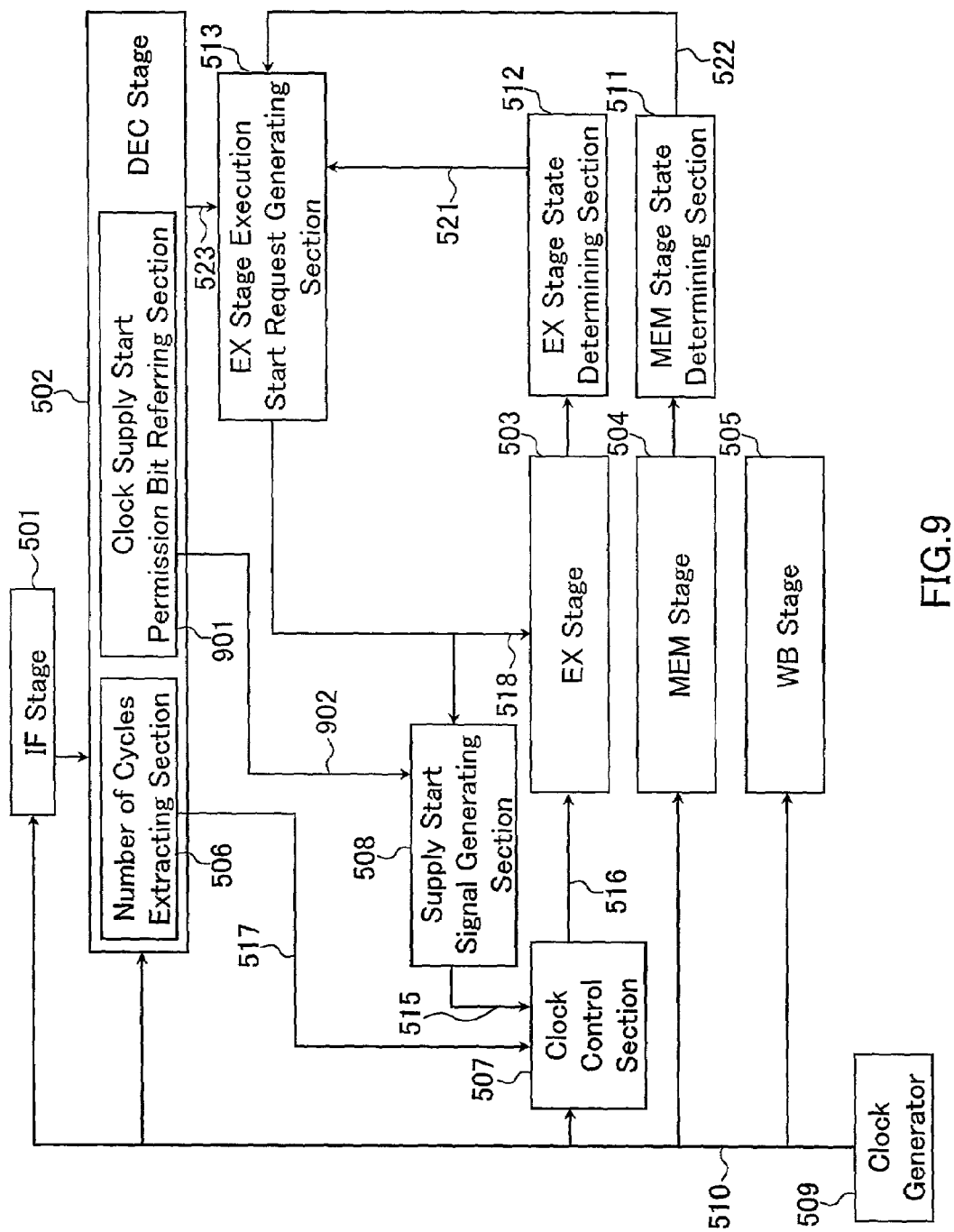
FIG. 9 is a view illustrating a configuration of a processor in an information processing device employing a clock control method according to a sixth embodiment of the present invention.

The following description will depict the sixth embodiment of the present invention, while referring to the drawings. FIG. 9 illustrates a configuration of a processor that performs pipeline processing employing a clock control method according to the sixth embodiment, like in the third embodiment.

FIG. 9 illustrates a processor that extracts the number of cycles for execution at the EX stage by means of an instruction decoder, and that extracts the number of cycles of the clock to be supplied at the EX stage from an instruction bit code, and extracts a determination of whether the clock supply should start when an instruction is shifted to the EX stage from a clock supply start permission bit.

Therefore, in the fifth embodiment, the DEC stage for decoding an instruction is provided with a clock supply start permission bit referring section 901 that refers to a clock supply start permission bit in instruction data.

FIG. 10 illustrates an instruction code of a processor employing the clock control method according to the sixth embodiment. In FIG. 10, an instruction code 101 is composed of a clock supply start permission bit 104, an execution cycle number field 102, and an execution instruction field 103. It should be noted that the execution cycle number field 102 is indicative of the number of cycles for execution at the EX stage.

The clock supply start permission bit 104 is used for determining whether, when an instruction is shifted to the EX stage, the clock supply should be started immediately, or the clock supply is started after the execution of a preceding instruction at the MEM is completed.

The bit is set in the case where the execution cannot be started at the cycle where the instruction is being shifted to the EX stage, and in the case where a dependence relationship is present between the instruction to be executed at the EX stage and the preceding instruction.

The following description will depict how to set the clock supply start permission bit 104, employing two program examples PROG-A and PROG-B shown in FIG. 11. The PROG-A and PROG-B are instruction streams that read out and add data.

The PROG-A includes an instruction 1 for reading out data of an address in an address register a0 and storing the same in a data register d0, and an instruction 2 for adding 1 as a hexadecimal number to the data in the data register d1 and storing the addition result in the data register d1.

In the case of the PROG-A, the data register related with the instruction 1 and the data register related with the instruction 2 are different. More specifically, since the instruction 2 is not dependent on the instruction 1, it is possible to start the clock supply and to start the execution immediately in response to the input of the instruction 2 to the EX stage. In this case, "1" is set in the clock supply start permission bit 104.

On the other hand, in the case of the PROG-B, the instruction 3 is an instruction for reading data out of an address in the address register a0 to the data register d0, and the instruction 4 is an instruction for adding 1 as a hexadecimal number to a value in the data register d0 and storing the addition result in the data register d0. In the PROG-B, since the instructions 3 and 4 are dealt with by the same data register, the instruction 4 is dependent on the instruction 3. Therefore, in the case where the instruction 4 is shifted to the EX stage, if the execution of the instruction 3 at the MEM stage has not been completed yet, the value in the d0 register is unknown, and hence, the execution of the instruction 4 cannot be started. In this case, "0" is set in the clock supply start permission bit 104.

It should be noted that the instruction dependence relationship can be extracted when the program is converted into an execute-form code. Therefore, in the hardware, a particular circuit for extracting a dependence relationship is not necessary.

More specifically, as shown in FIG. 9, the clock supply start permission bit 104 is referred to in the clock supply start permission bit referring section 901 when an instruction code is decoded at the DEC stage, and the clock supply start permission signal 902 is inputted to the supply start signal generating section 508.

The supply start signal generating section 508 generates a clock start request signal 515 based on the execution start request 518 at the EX stage and a clock supply start permission bit 902, and supplies the same to the clock control section 507.

As described above, according to the sixth embodiment, the clock supply start signal can be generated without hardware for detecting a dependence relationship between an instruction at the EX stage and an instruction at the MEM stage. Thus, the present embodiment makes it possible to omit hardware for detecting a dependence relationship.

Seventh Embodiment

The following description will depict the seventh embodiment of the present invention, while referring to the drawings. The seventh embodiment further reduces power consumption in the case where high-speed operations are not necessary in the pipeline execution, by employing a low-speed operation bit equivalent to the clock supply start permission bit shown in the sixth embodiment.

FIG. 12 illustrates an instruction code used in the seventh embodiment. In FIG. 12, the instruction code 121 has a configuration substantially identical to the instruction code shown in FIG. 10, except that it has a low-speed operation bit 124 in place of the clock supply start permission bit 104.

Figure 13:
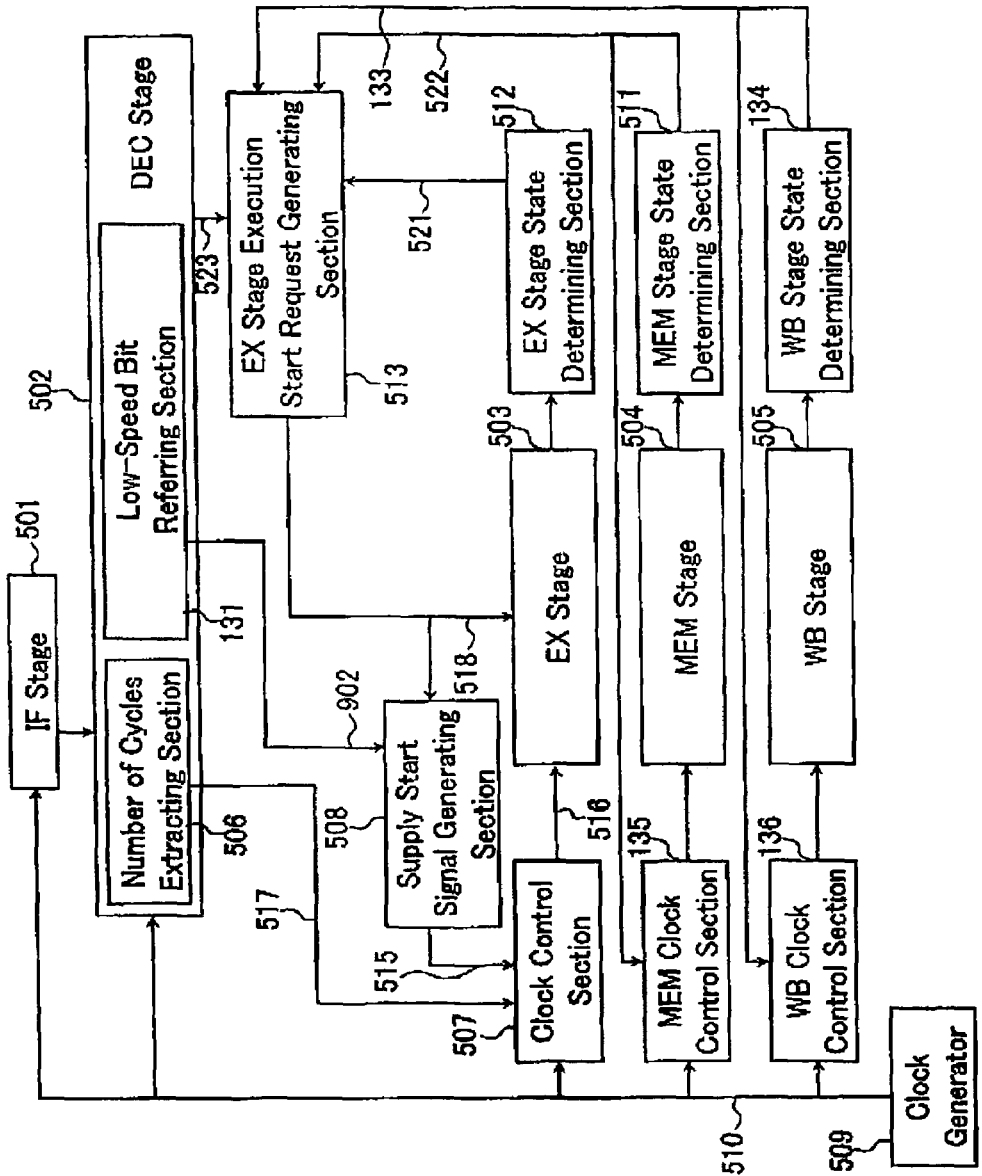
FIG. 13 is a view illustrating a configuration of a processor in an information processing device employing the clock control method according to the seventh embodiment of the present invention.

FIG. 13 illustrates a processor configuration in an information processing device employing a clock control method according to the seventh embodiment. The clock control is performed only at the EX stage with the clock control circuit being provided in only the EX stage in the pipeline configuration shown in FIG. 9, whereas herein likewise a clock supply control section 135 and a clock supply control section 136 are provided at the MEM stage and WB stage, respectively, so that more detailed clock control is performed.

First of all, the clock control section at the MEM stage performs control so that the clock is supplied only when an instruction is present at the MEM stage and the instruction is being executed, according to an output 522 of the MEM stage state determining section 511 that determines whether or not an instruction is present and is executed at the MEM stage.

Likewise, the WB stage clock supply control section 136 performs control so that the clock is supplied only when an instruction is executed at the WB stage, according to an output 133 of the WB stage state determining section 134.

When an instruction is shifted to the DEC stage and is decoded, simultaneously the number of cycles for execution at the EX stage of the instruction is extracted by the number of cycles extracting section 506. At the same time, the low-speed operation bit 124 in the instruction code is extracted by a low-speed operation bit referring section 131.

In the case where an instruction whose low-speed operation bit 124 is set to "1" is executed, the clock supply to the EX stage is not started immediately when the instruction is shifted to the EX stage, so that the execution is started after the execution of a preceding instruction at the MEM stage and at the WB stage is completed. More specifically, in the case where the low-speed operation bit 124 is set, the clock supply to the EX stage is started so that execution is started therein after any instruction is no longer present at the MEM stage and the WB stage and the clock supply to the MEM stage and to the WB stage is stopped.

Figure 14A:
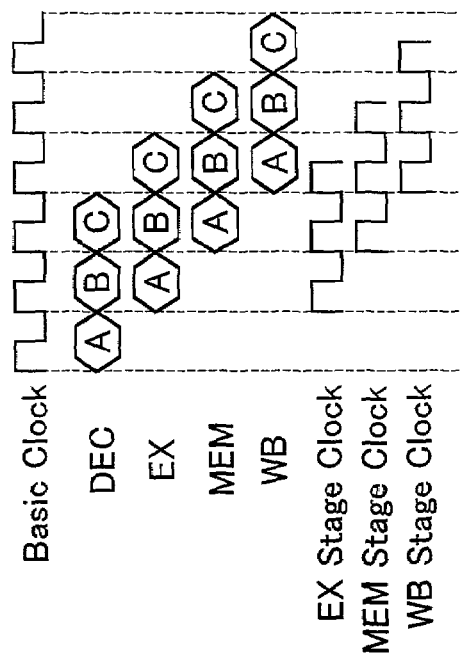
FIGS. 14A and 14B are clock supply timing charts of the information processing device employing the clock control method according to the seventh embodiment of the present invention.
Figure 14B:
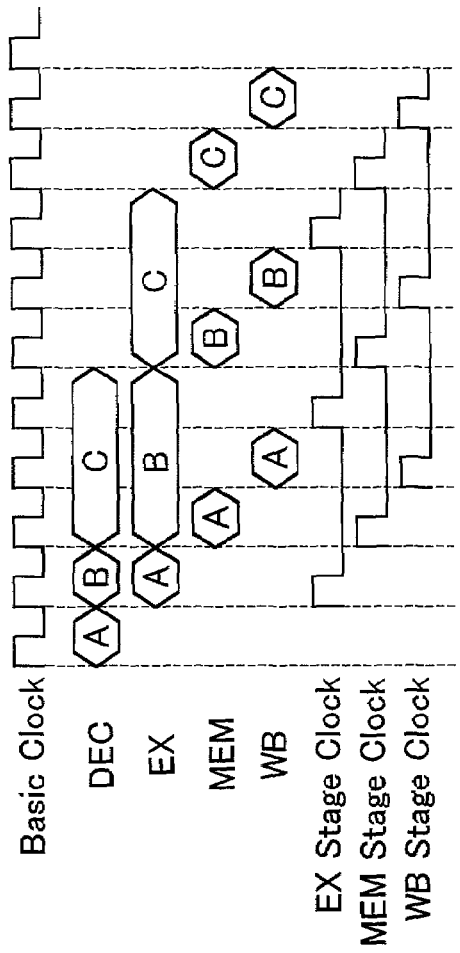

FIGS. 14A and 14B schematically illustrate clock supply. FIGS. 14A and 14B are pipeline charts in the case where instructions A, B, and C that have no dependence relationship therebetween are executed successively. FIG. 14A illustrates a case where the low-speed operation bit 124 is "0", and FIG. 14B illustrates a case where the low-speed operation bit 124 is "1".

As shown in FIG. 14A, in the case where all the instruction codes of the instructions A, B, and C have the low-speed operation bits 124 of "0", namely, in the case where the instructions A, B, and C are executed normally, the instructions A, B, and C are subjected to pipeline processing at the respective stages successively, and an EX stage clock, an MEM stage clock, and a WB stage clock are supplied as shown in FIG. 14A.

On the other hand, as shown in FIG. 14B, in the case where all the instruction codes have the low-speed operation bits 124 of "1", namely, in the case where the instructions A, B, and C are subjected to low-speed operations, the execution of the instruction B is not started before the execution of the instruction A is completed at the WB stage, even if the instruction B already has been shifted to the EX stage. After the execution of the instruction A is completed at the WB stage, the supply of the clock with the specified number of cycles to the EX stage is started so as to start the execution of the instruction B. When the clock supply and the execution of the instruction B are completed, the instruction B is shifted to the MEM stage, while the clock supply to the MEM stage has been suspended until this cycle. Furthermore, when the instruction that has been at the EX stage is shifted to the MEM stage, the instruction C is shifted to the EX stage, but the instruction C is suspended since the clock supply to the EX stage is not started before the execution of the instruction B at the WB stage is completed.

An EX stage clock, an MEM stage clock, and a WB stage clock in the case where all the instruction codes of the instructions A, B, and C have the low-speed operation bits 124 of "1" are supplied as shown in FIG. 14B.

According to the foregoing method, clock edges supplied to the respective stages during a certain set period decrease in number as compared with normal cases, thereby making it possible to suppress power consumption.

Not all the processing performed by a processor requires high-speed operations. In the case where high-speed processing is not required, it is possible to reduce the power consumption needed for the processing by setting the low-speed operation bit 124 as desired, though it impairs execution performance. It should be noted that, though the present embodiment takes as an example a case where the low-speed operation bit is provided in the instruction code, it is not necessarily provided in the instruction code exclusively. A technique may be employed in which such an operation is carried out by setting a register in a CPU, for instance.

Figure 15:
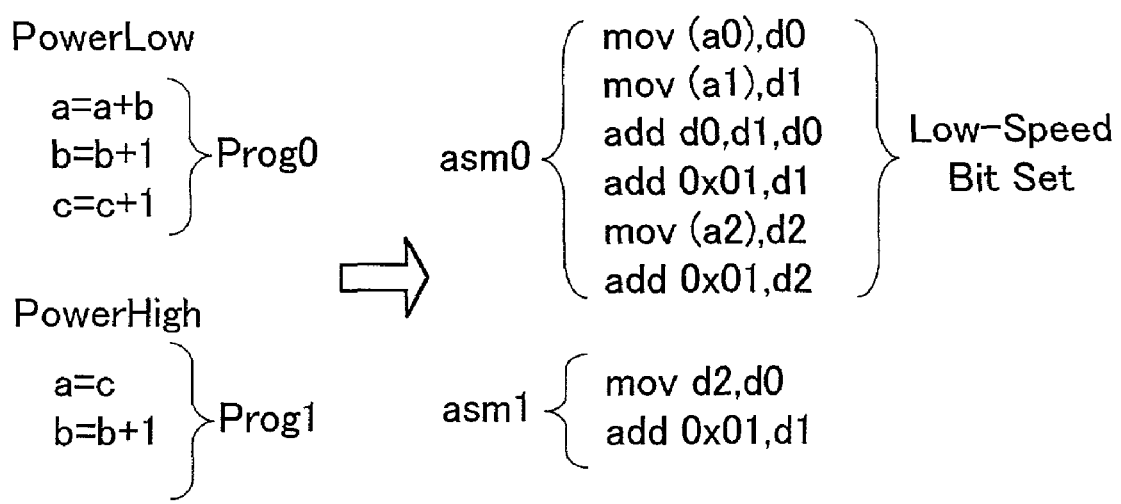
FIG. 15 is a view illustrating an example of a high-level language program used in the clock control method according to the seventh embodiment of the present invention.

FIG. 15 illustrates a program processing technique that allows a programmer to specify whether or not to degrade execution performance and reduce power consumption when he/she writes the program, thereby carrying out programming while taking power consumption into consideration.

For instance, as shown in FIG. 15, in high-level language programming, a reserved word that indicates the start of a routine executed with reduced power consumption and a reserved word that indicates the return to the processing with normal power consumption may be defined, so that either of the routines can be specified so as to be carried out. In FIG. 15, "PowerLow" indicates that this reserved word is followed by a routine of low-speed operation, while "PowerHigh" indicates that this reserved word is followed by a routine of a normal high-speed operation.

The high-level language programs Prog0 and Prog1 represent a processing description for a low-speed operation and a processing description for a high-speed operation, respectively.

The high-level language programs Prog0 and Prog1 are converted once into assembler programs that are machine language programs of the processor, from which execute-form codes are produced. When the assembler programs are converted into actual execute-form codes, the assembler manipulates a clock supply start permission bit of an instruction code.

For instance, in FIG. 15, the high-level language programs Prog0 and Prog1 are converted into asm0 and asm1, respectively.

Since the Prog0 relates to processing for a low-speed operation, "1" is set in all low-speed operation bits 124 of instruction codes corresponding to instructions in the assembler code asm0 into which the Prog0 has been converted.

On the other hand, "0" is set in all low-speed operation bits 124 of instruction codes corresponding to instructions in the assembler code asm1 into which the Prog1 has been converted.

As described above, according to the seventh embodiment, since a processor by no means detects a power consumption state dynamically, there is no need to provide a detecting circuit as hardware, thereby ensuring lower power consumption.

Furthermore, since the programmer is allowed to grasp the relationship between power consumption and execution processing performance so as to make arbitrary manipulation, this makes it possible to develop programs with power consumption taken into consideration.

As described above, with an information processing device employing a clock control method according to the present invention, it is possible to achieve an effect of reduction of power consumption without impairing execution performance of a processor that performs pipeline processing. Furthermore, allowing the number of cycles for execution to be defined in an instruction code makes it possible to suppress an increase in hardware resource while achieving an effect of reduction of power consumption.

Furthermore, with a bit in an instruction code and a program describing technique that specify a low-speed operation, it is possible to arbitrarily degrade the pipeline operation performance and reduce power consumption. This operation is implemented in a program, and programs can be developed with power consumption upon execution taken into consideration.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A clock control method employed in an information processing device, the information processing device including:
   first and second processing circuits that perform processing in synchronization with a clock; and
   a clock supply control circuit that controls supply of the clock to the first processing circuit,
   wherein a result of the processing in the first processing circuit is inputted to the second processing circuit,
   in the case where first processing and second processing are executed successively in the first processing circuit, and the first processing circuit starts executing the second processing simultaneously when the second processing circuit starts executing third processing with respect to the result of the processing in the first processing circuit as an input thereto, the clock control method comprising:
   (1) extracting a first number of cycles required for the execution of the processing in the first processing circuit;
   (2) transferring the first number of cycles to the clock supply control circuit;
   (3) starting the supply of the clock when the processing is started in the first processing circuit;
   (4) determining whether or not the second processing circuit can start processing, when the supply of the clock with the first number of cycles is completed;
   (5) extracting a second number of cycles required for the execution of the second processing in the first processing circuit;
   (6) transferring the second number of cycles to the clock supply control circuit;
   (7) inputting a result of the processing in the first processing circuit to the second processing circuit in the case where it is determined at the operation (4) that the processing can be started; and
   (8) starting the supply of the clock with the second number of cycles to the first processing circuit so as to start the second processing in the first processing circuit, in the case where it is determined at the operation (4) that the processing can be started.

2. An information processing device employing the clock control method according to claim 1.

3. A clock control method employed in an information processing device that is capable of pipeline processing of an instruction, the method comprising:
   extracting a number of cycles required for execution of an instruction at an execution stage;
   controlling supply of a clock to a circuit belonging to the execution stage; and
   transferring the extracted number of cycles,
   wherein the supply of the clock is carried out for the number of cycles since start of the execution of the instruction and stopping the supply of the clock to the processing circuit when the supply of the clock with the number of cycles is completed until the next processing is started at the execution stage,
   in the operation of extracting the number of cycles, as to each instruction, the number of cycles for execution at the execution stage is specified, so that the number of cycles for execution is extracted as the number of cycles simultaneously when an instruction code is decoded and a type of the instruction is determined, and
   in the operation of extracting the number of cycles, all instructions executed by the information processing device are divided into groups according to the numbers of cycles for execution at the execution stage, group identification numbers are given to the groups, and a group identification number field in which the group identification number is set is provided in each instruction code, so that the group identification number is extracted and the number of cycles for execution corresponding to the group identification number is extracted as the number of cycles from the group identification number field, simultaneously when the instruction code is decoded and a type of the instruction is determined.

4. A clock control method employed in an information processing device that is capable of pipeline processing of an instruction, the method comprising:
   extracting a number of cycles required for execution of an instruction at an execution stage;
   controlling supply of a clock to a circuit belonging to the execution stage; and
   transferring the extracted number of cycles,
   wherein the supply of the clock is carried out for the number of cycles since start of the execution of the instruction and stopping the supply of the clock to the processing circuit when the supply of the clock with the number of cycles is completed until the next processing is started at the execution stage, in the operation of extracting the number of cycles, as to each instruction, the number of cycles for execution at the execution stage is specified, so that the number of cycles for execution is extracted as the number of cycles simultaneously when an instruction code is decoded and a type of the instruction is determined, and in the operation of extracting the number of cycles, in the case where a variable-length instruction is processed, the number of cycles for execution at the execution stage is specified as to each instruction word length of an instruction code, so that the number of cycles for execution is extracted as the number of cycles from the instruction word length of the decoded instruction simultaneously when the instruction code is decoded and a type of the instruction is determined.

5. A clock control method employed in an information processing device that is capable of pipeline processing of an instruction, the method comprising:

extracting the number of cycles required for execution of an instruction at an execution stage;

controlling supply of a clock to a circuit belonging to the execution stage;

transferring the number of cycles; and starting the supply of the clock at start of the execution of the instruction at the execution stage, wherein in the case where the starting of the supply of the clock is selected in a clock supply selecting operation, the supply of the clock with the number of cycles is started at the start of the execution of the instruction at the execution stage in the clock supply controlling operation, and in the clock supply selecting operation, a clock supply permission bit is provided in an instruction code that is indicative of whether the supply of the clock is to be started at the start of the execution of the instruction at the execution stage, so that information on whether the supply of the clock is to be started is extracted from the clock supply permission bit upon decoding of the instruction code.

6. The clock control method according to claim 5, wherein a dependence relationship between a first instruction and a second instruction that are successive instructions is analyzed, and in the case where the second instruction refers to an execution result of the first instruction, the clock supply permission bit is set in an ON state.

7. A clock control method employed in an information processing device capable of pipeline processing of an instruction, the method comprising:

extracting a number of cycles required for execution of an instruction at an execution stage;

controlling supply of a clock to a circuit belonging to the execution stage;

transferring the number of cycles;

starting the supply of the clock at start of the execution of the instruction at the execution stage; and determining a state of a stage next to the execution stage, wherein in the case where the starting of the supply of the clock is selected in a clock supply selecting operation and it is determined in the next stage state determining operation that the next stage is ready for execution, the supply of the clock with the number of cycles is started at the start of the execution of the instruction at the execution stage in the clock supply controlling operation.

8. The clock control method according to claim 7, wherein the clock supply selecting operation includes a sub-operation of determining a state of the first instruction being executed at the stage next to the execution stage, and a dependence relationship between a second instruction to be executed at the execution stage and the first instruction, wherein:

in the case where the second instruction is dependent on an execution result of the first instruction, not starting the supply of the clock with the number of cycles required for execution of the second instruction at the execution stage before completion of the execution of the first instruction is selected; and in the case where the second instruction is not dependent on the completion of the execution of the first instruction, carrying out the supply of the clock with the number of cycles required for the execution at the execution stage is selected.

9. An information processing device employing the clock control method according to claim 7.

10. A clock control method employed in an information processing device capable of pipeline processing of an instruction, the method comprising:

extracting the number of cycles required for execution of an instruction at an execution stage;

controlling supply of a clock to a circuit belonging to the execution stage;

transferring the number of cycles;

starting the supply of the clock at start of the execution of the instruction at the execution stage; and detecting completion of execution of instructions at all stages behind the execution stage;

wherein in the case where the starting of the supply of the clock is selected in a clock supply selecting operation and it is detected that the execution of instructions is completed at all the stages behind the execution stage, the supply of the clock with the number of cycles is started at the start of the execution of the instruction at the execution stage in the clock supply controlling operation.

11. The clock control method according to claim 10, wherein the supply of the clock to each of the stage is controllable at each of the stages in the pipeline, and the supply of the clock to each of the stage can be suspended except when an instruction is being executed at each of the stages.

12. The clock control method according to claim 11, wherein in the case where a low-speed operation bit is provided in an instruction code and an instruction in which the low-speed operation bit is set is executed at the execution stage, the supply of the clock with the number of cycles is started after it is detected that execution of a preceding instruction is completed at all the stages behind the execution stage.

13. The clock control method according to claim 10, wherein an execute-form code is generated according to a program described in a high-level language, the method further comprising an operation of:

specifying whether or not a low-speed operation is to be carried out, with program description in the high-level language, wherein in the case where the program description that specifies with the high-level language that the low-speed operation is to be carried out is converted into an execute-form code, a clock supply start permission bit is set in an ON state.

14. An information processing device employing the clock control method according to claim 10.

* * * * *